Dec. 14, 1954   G. I. CHINN   2,696,761
GUN ELEVATING MECHANISM
Filed July 15, 1944   4 Sheets-Sheet 1

Inventor
George I. Chinn
By C. E. Herrstrom & W. E. Thibodeau
Attorneys

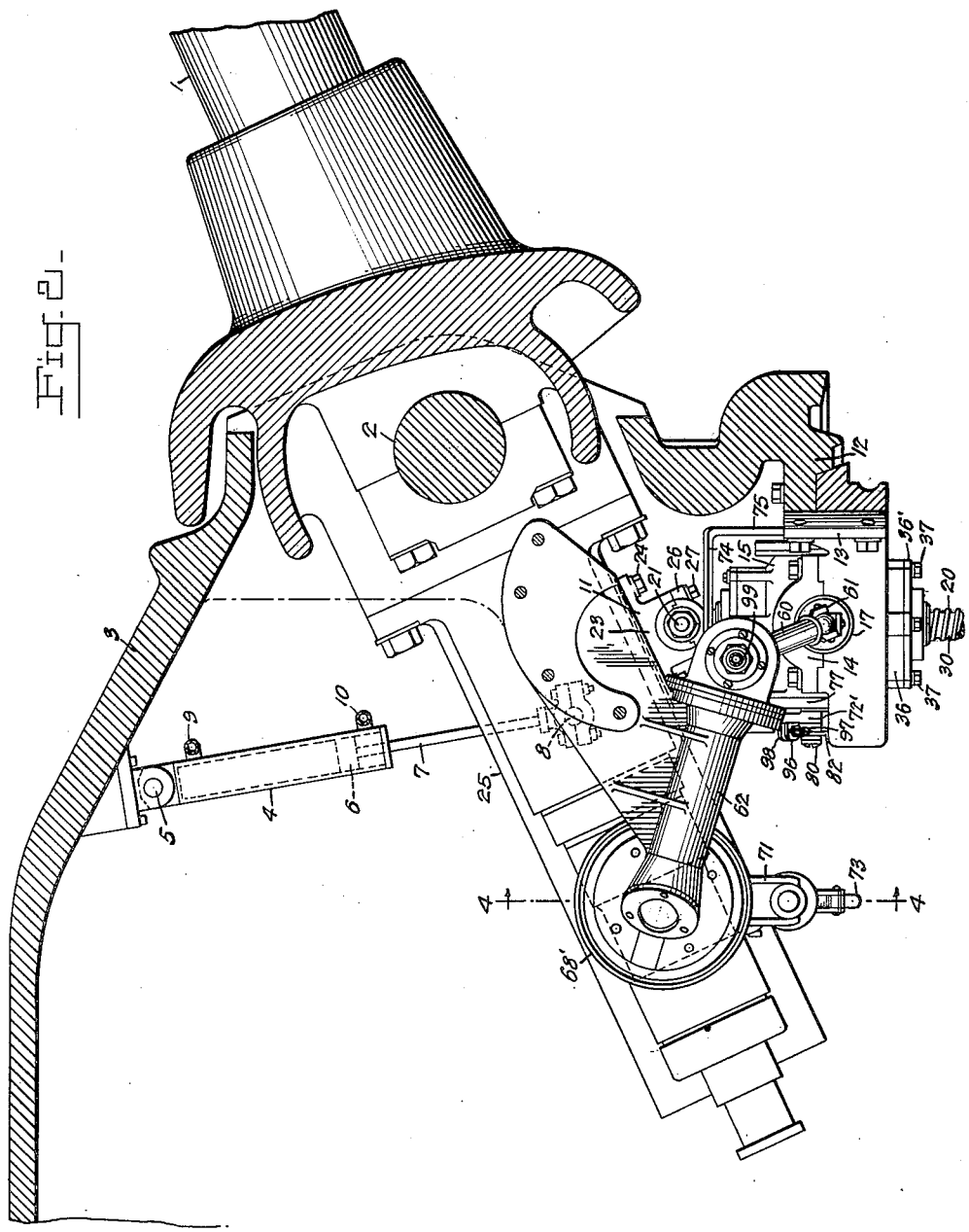

Dec. 14, 1954   G. I. CHINN   2,696,761
GUN ELEVATING MECHANISM
Filed July 15, 1944   4 Sheets-Sheet 3
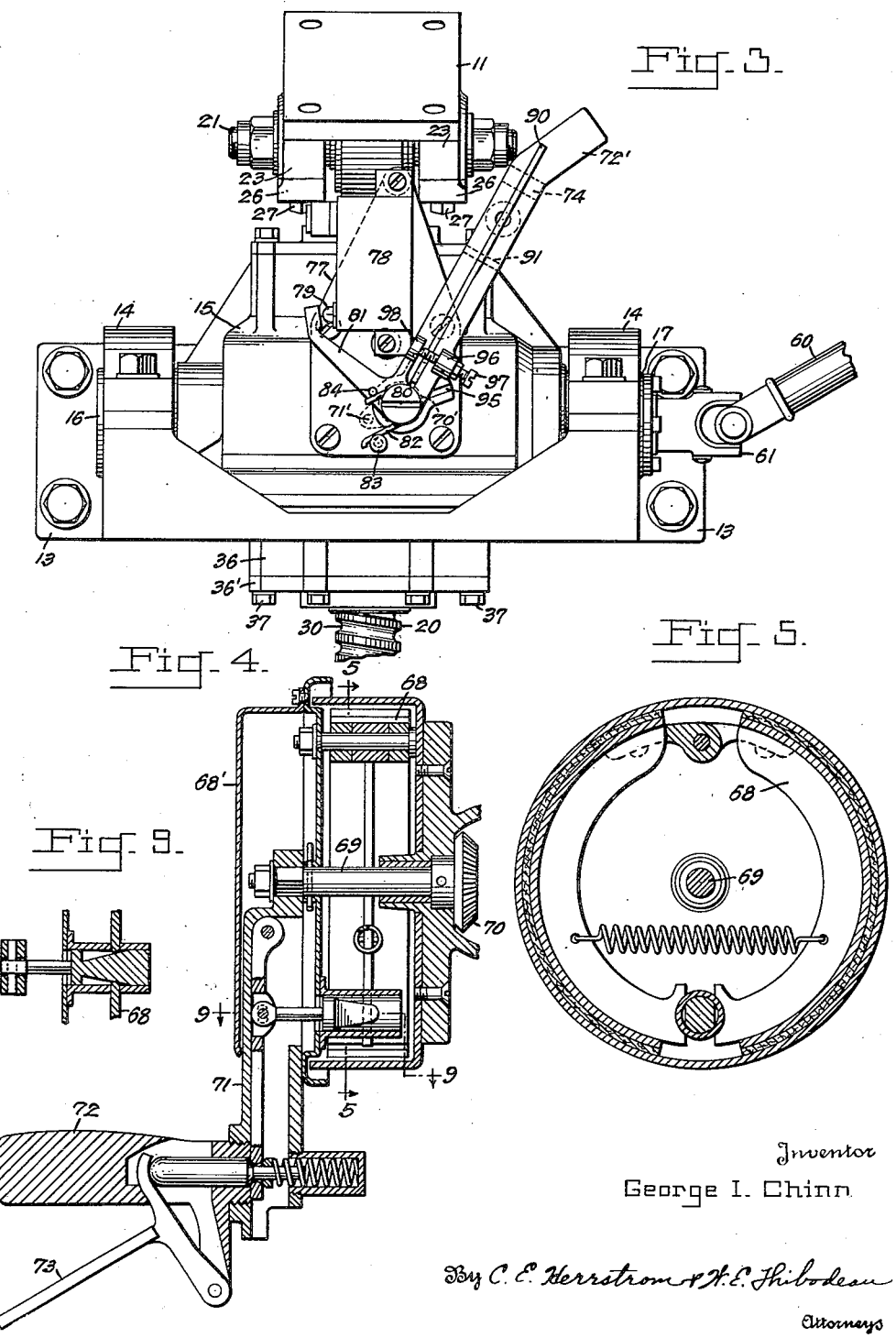
Inventor
George I. Chinn
By C. E. Herrstrom & H. E. Thibodeau
Attorneys Dec. 14, 1954  G. I. CHINN  2,696,761
GUN ELEVATING MECHANISM
Filed July 15, 1944  4 Sheets-Sheet 4
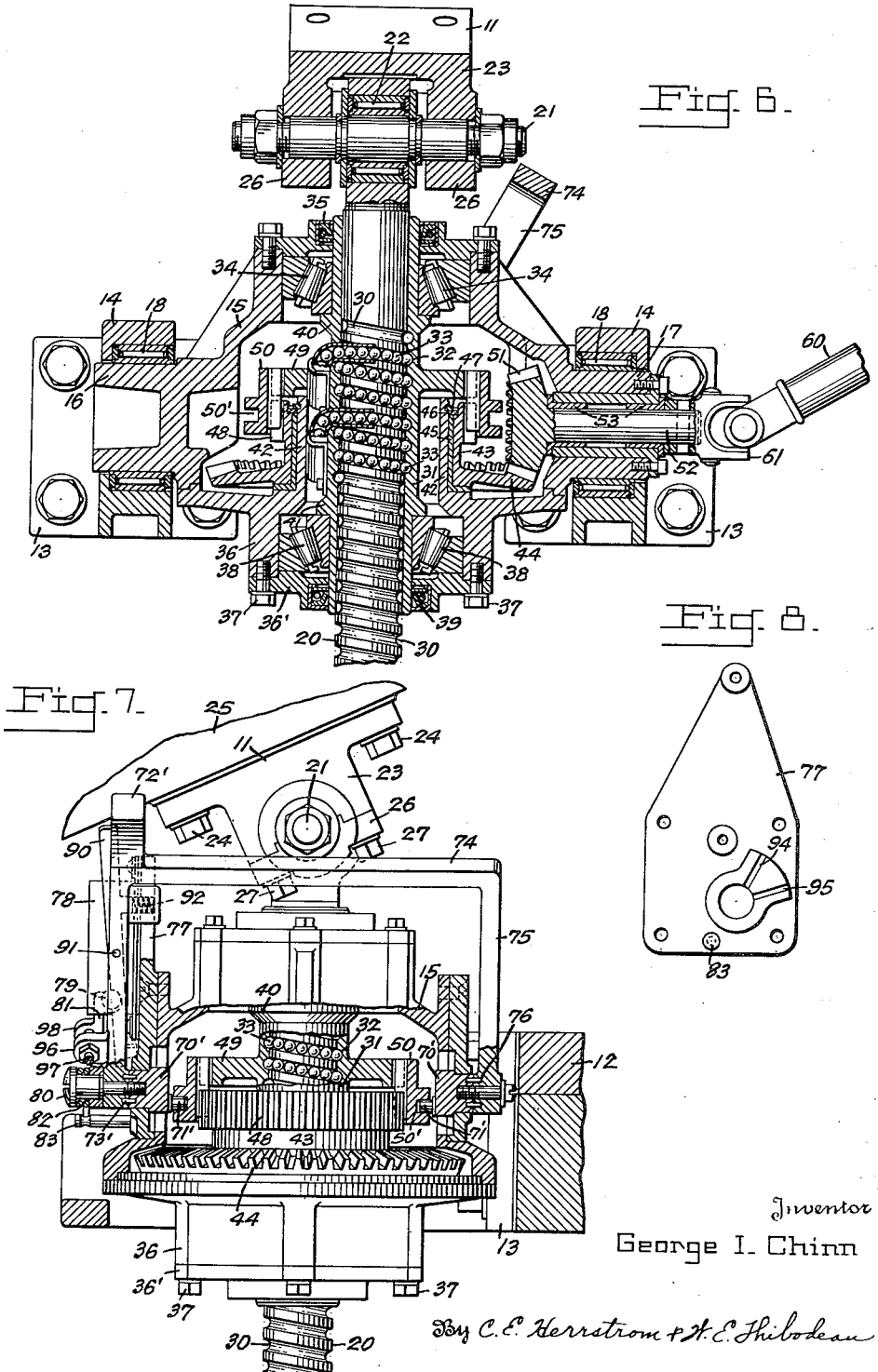
Inventor
George I. Chinn
By C. E. Herrstrom & H. E. Thibodeau
Attorneys United States Patent Office 2,696,761
Patented Dec. 14, 1954

2,696,761

GUN ELEVATING MECHANISM

George I. Chinn, Detroit, Mich.

Application July 15, 1944, Serial No. 545,165

9 Claims. (Cl. 89—41)

(Granted under Title 35, U. S. Code (1952), sec. 266)

The invention described herein may be manufactured and used by or for the Government for governmental purposes, without the payment to me of any royalty thereon.

This invention relates generally to gun elevating mechanisms and more particularly to gun elevating mechanisms used in conjunction with a stabilizing system.

Many of the combat tanks used in the current war are equipped with a gyro stabilizer for the elevation of the gun while the tank is in motion. When the tank is not in motion, such stabilizing is not required and the gun is elevated through gearing.

The stabilizing apparatus causes hydraulic actuation of a rod lying in a vertical plane and attached to the gun. The gear mechanism for elevating the gun when stationary ordinarily includes a screw shaft attached to the gun and driven by a nut thereon. When the stabilizer is used, the screw shaft must follow the movements of the gun to which it is attached. In order to permit movement of the shaft within the nut during operation of the stabilizer, it has been necessary to provide a split nut with means for moving it out of engagement with the thread on the shaft, inasmuch as such a screw shaft and nut constitute an irreversible system.

The object of this invention is to provide a construction wherein the nut need not be opened or separated from the screwshaft. This object is accomplished by the use of a so-called ball and nut screw, wherein the spaces between the threads of both the screw and the nut are concave in axial cross section on equal radii, with ball bearings mounted in the registering spaces of the screw and the nut. The shaft can then be pulled or pushed through the nut in response to movements of the gun under the action of the stabilizer.

The invention also includes mechanism whereby the gear drive for the elevating mechanism may be clutched or declutched with respect to the nut according to whether the gun is to be elevated by the gear drive or by the stabilizer.

Other objects of my invention will become evident from the following detailed description taken in conjunction with the accompanying drawings in which:

Figure 2 is a side elevation partly in section of the structure shown in Figure 1;

Figure 3 is a rear elevation of the stabilizing apparatus shown in Figure 1;

Figure 4 is a vertical cross section taken on the plane indicated by the line 4—4 of Figure 2;

Figure 5 is a cross section taken on the plane indicated by the line 5—5 of Figure 4;

Figure 6 is a vertical cross section taken on the plane indicated by the line 6—6 of Figure 1;

Figure 7 is a side elevation partly in section of the stabilizing apparatus shown in Figure 3, and Figure 8 is a detail elevation of the bracket shown in Figure 3.

Figure 9 is a cross section taken on the plane indicated by the line 9—9 of Figure 4.

Figure 1:
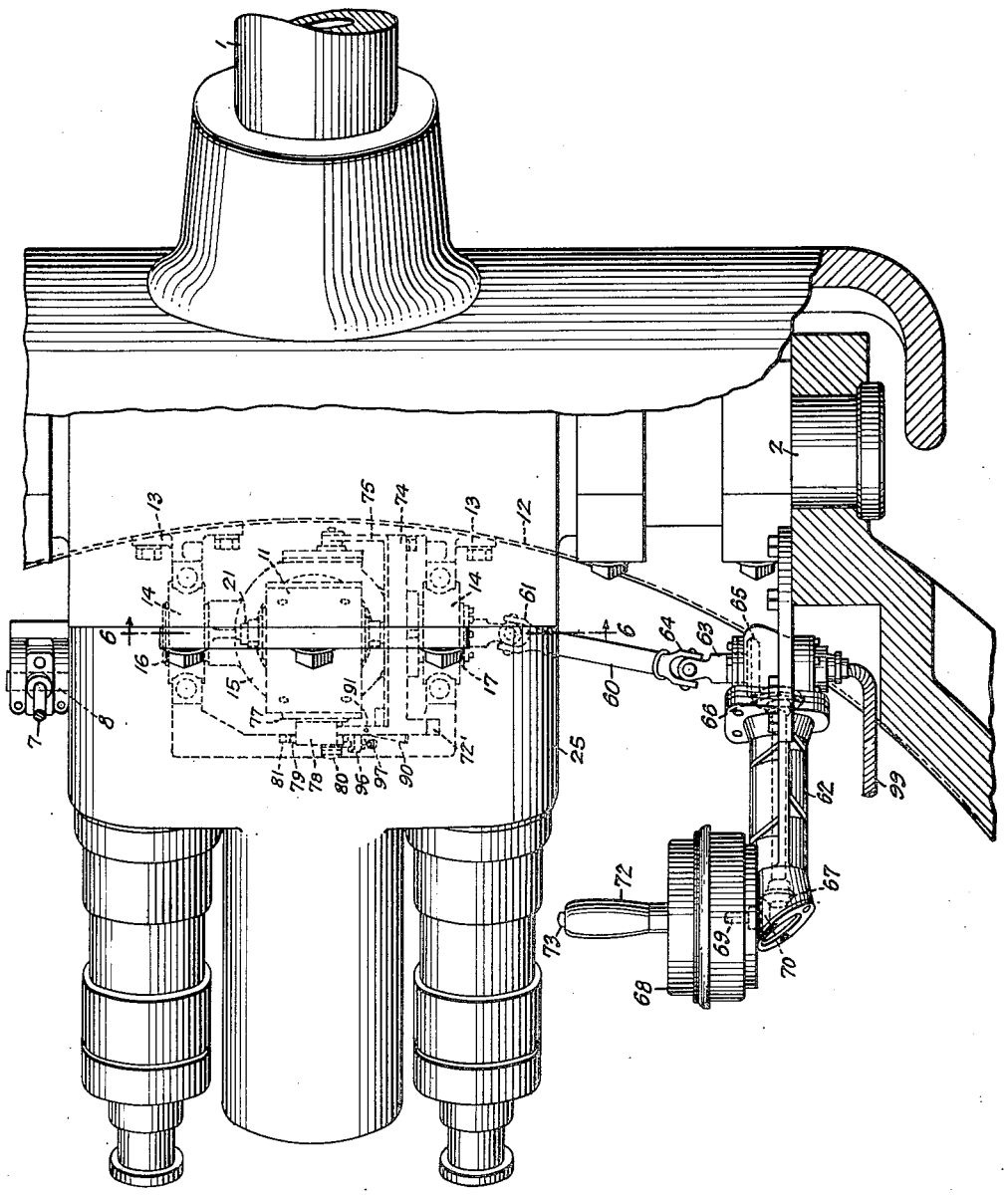
Figure 1 is a plan view of a portion of a tank partly broken away and including the structure of the present invention.

Referring to the drawings, Figures 1 and 2 show a gun 1 mounted on trunnions 2. A cylinder 4 depends from the roof of a turret 3 on a pivotal mounting 5. Cylinder 4 contains a piston 6 from which extends a rod 7 pivotally attached at 8 to the gun 1. The piston 6 is hydraulically operated through lines 9 and 10 extending to the cylinder 4 at points above and below the piston. The hydraulic system is controlled from a gyroscope mounted in the vehicle in a manner already known in the art and stabilizes the gun while the gun mount is in motion. As distinguished from the stabilizer system, the mechanical elevating mechanism is attached to the gun by a structure designated in general by the numeral 11 and described more fully hereinafter.

Another portion of the turret is indicated by the numeral 12, and to this portion is bolted a pair of brackets 13 supporting a pair of split bearing rings 14 in alinement. The latter serve to support the main housing 15 which has journalled trunnions 16, 17 engaging roller bearings 18. The order of description of the remaining structure is not necessarily the order of assembly.

Through the vertical axis of the housing 15 is passed a screwshaft 20 having a cross pin 21 passed through its upper exposed end and engaging bearings 22. The pin 21 is also received in a split bearing comprising an upper section 23 bolted at 24 to the member 25 and a lower section 26 fastened by screw bolts 27 to the section 23. This assembly constitutes the connection 11 between the shaft 20 and the gun. The gun 1 is elevated mechanically, as distinguished from stabilizer adjustment, by movement of the shaft axially in the housing 15 by mechanism which will now be described.

The threads on the shaft 20 have a root surface 30 that is concave, preferably semi-circular, in cross section. In other words, the space between any two convolutions has a wall of the configuration described. On the shaft 20 is mounted a sleeve 31 formed with internal threads complementary to the threads on the shaft and of the same dimensions and having similar concave root surfaces 32. The threads on the shaft 20 and sleeve 31 are brought into mesh or engagement with one another only through ball bearings 33, each of which is received between a pair of matched concave surfaces 30, 32 and crosses the projected, unthreaded cylindrical surface of the shaft. This form of shaft and nut assembly is known in the art as a ball nut and screw and therefore requires no further illustration and description.

The sleeve 31 is supported in the top of the housing 15 by tapered thrust bearings 34 and sealed by an oil seal 35. The bottom of the housing 15 is closed by a separate cap 36 to which is applied an end plate 36' secured by bolts 37. The lower end of the sleeve 31 is supported by tapered thrust bearings 38 mounted in the cap 36, and the plate 36' receives a bottom seal 39. The sleeve 31 is accurately located in the housing by means of flanges 40 and 41 in engagement with thrust bearings 34 and 38.

The cap 36 is formed with an upwardly extending cylindrical wall 42 (Fig. 6) concentric with and spaced from the sleeve 31. On the wall 42 is rotatably mounted a hub 43 on which is formed a horizontal bevel actuating gear 44. Between the wall 42 of cap 36 and the hub 43 is mounted a flanged bushing 45 held by a thrust washer 46 and a snap ring 47. At its upper end the hub 43 carries a clutch element in the form of a spur gear 48 adjacent to which is a similar clutch element in the form of a gear 49 of equal dimensions formed on the sleeve 31. A dog clutch 50 is adapted to interlock the gears, or in another position, to free the gear 49 from the gear 48.

The bevel gear 44 is in constant mesh with a bevel pinion 51 having a stub shaft 52 extending through a bearing 53 fitted in the bearing 17. When the shaft 52 is rotated by means presently to be described, the threads in the sleeve 31 operate through the balls 33 to cause a shifting movement of the shaft 20 and a corresponding change in the elevation of the gun 1. This is the mechanical elevating mechanism employed when the gun mount is stationary and the gyro stabilizer is not used.

When the gun is gyro-stabilized against pitching of the tank or other mount, the shaft 20 must follow the elevational movements of the gun while connected thereto. The connection 11 should not be disturbed since it is accurately adjusted.

When the gyro stabilizer is to function, the clutch 50 is moved to disengaging position by mechanism that will presently be described. The ball nut and screw is of such nature as to be reversible in its action or yieldable to a sliding movement of the shaft 20. Such movement initiated by the power means 4—7 driving the gun draws the shaft through the sleeve 31 which is thereby driven in rotation about the shaft.

Externally of the housing 15, an operating link 60 is attached to the shaft 52 by a universal joint coupling 61. It is evident that rotation of the link 60 results in rotation of the pinion 51 for mechanical operation. The means for rotating and locking the link 60 is shown schematically and will be described merely in outline, since it is not an indispensable part of the invention.

A fixed housing 62 journals a stub-shaft 63 connected by a universal joint 64 to the other end of the link 60 and carries a bevel gear 65 within the housing. The housing is elongated and rotatably supports a shaft carrying gears 66 and 67, the former of which meshes with the gear 65. To the housing 62, near the gear 67, is attached a brake mechanism 68 having a central rotatable shaft 69 carrying a gear 70 meshing with the gear 67. An arm 71 is mounted to rotate with a brake cover 68' around the brake and carries a handle 72 rotatable about the axis of the brake mechanism. The cover 68' rotates the shaft 69, and the handle 72 carries a brake-operating lever 73. When the handle 72 and the lever 73 are grasped and brought together, the brake shoes are released from the brake drum, and the shaft can be rotated from the handle 72. Conversely, when the brake lever 73 is released, the brake locks on the brake drum and thereby locks the train of gearing extending to the sleeve 31 to lock the elevation of the gun. It will be obvious that in the use of this mechanism, the dog clutch 50 is engaged.

For shifting the clutch 50, a pair of bosses 70' are mounted rotatably in the housing 15 at diametrically opposite points and formed each with a cam finger 71' extending into the outer circumferential channel 50' in the member 50. An operating handle 72' is fastened to one of the members 70' by pins 73' and is formed with a bridge 74 from which extends an arm 75 into a position adjacent to the remaining member 70' to which it is pinned at 76. Movement of the handle structure rotates the pins 71' and shifts the clutch 50.

A bracket 77 is attached to the housing 15 to support a micro-switch 78 attached thereto and having a push button 79. A screw 80 is mounted in the axis of rotation of the handle 72' and has rotatably mounted thereon a switch operating finger 81 in the form of a bell crank lever. The member 80 is also surrounded by a coil spring 82, one end of which abuts a finger 83 and the other end of which engages a finger 84 on the member 81.

On the handle 72' is mounted a locking lever 90 on a pivot pin 91. The upper end of the lever 90 is normally urged outwardly by a coil spring 92. Near the inner end of the lever 90, a pair of slots 94 and 95 in bracket 77 selectively receive the end of the lever 90 and thus hold the clutch 50 in engaged or disengaged position.

On the handle 72' is formed a lug 96 which receives an adjusting screw 97 adapted to engage a stop lug 98 on the bell crank finger 81 when the handle 72 is locked in the clutch-engaging position as indicated in Fig. 3. This engagement releases the finger 81 from the switch button 79, opening the micro-switch 78 and cutting out the stabilizer system. This occurs substantially when the clutch has become fully engaged. On disengagement, by moving the handle 72' towards the slot 95, or clockwise as indicated in Fig. 3, the tension of the spring 82 moves the finger 81 against the button 79 to close the switch. The movement of the handle 72' is, however, continued until the inner end lever 90 is locked in the slot 95.

When the gun is elevated manually by the mechanism hereinbefore described, it is necessary to reset the stabilizer system and this is accomplished by a flexible cable 99 having one end operatively connected to the gearing in housing 62 and the opposite end connected to the gear box of the stabilizer (not shown).

Various changes may be made in the specific embodiment of the present invention without departing from the spirit thereof or from the scope of the appended claims.

What I claim is:

1. In combination, a gun, power operated means and manually operable means for moving the gun in elevation, selectively operable means for alternately rendering one of said means effective and the other ineffective, said manually operable means comprising a screw shaft, a nut engaging said shaft, means for effecting relative rotation between said shaft and said nut for displacing one of these members axially, means responsive to axial displacement of said one of said members for moving the gun in elevation, said shaft and said nut having opposed mating helical grooves, and anti-friction balls filling said grooves, whereby said one of said members may be displaced axially relative to the other in response to control of the gun by said power operated means.

2. In combination, a gun, power operated means and manually operable means for moving the gun in elevation, selectively operable means for alternately rendering one of said means effective and the other ineffective, said manually operable means comprising a screw shaft, a nut engaging said shaft, means for effecting relative rotation between said shaft and said nut for displacing one of these members axially, means responsive to axial displacement of said one of said members for moving the gun in elevation, means for supporting said members for rotary movement about an axis disposed transversely of said shaft, said shaft and said nut having opposed mating helical grooves, and anti-friction balls filling said grooves, whereby said one of said members may be displaced axially relative to the other in response to control of the gun by said power operated means.

3. In combination, a gun, power operated means for moving the gun in elevation, manually operable means for elevating and depressing the gun, comprising a screw shaft, a nut engaging said shaft, means for effecting relative rotation between said shaft and said nut for displacing one of these members axially, means responsive to axial displacement of said one of said members for moving the gun in elevation, a housing for supporting said members gearing within the housing for operating the other of said members, a clutch within the housing and between the gearing and the other of said members, said shaft and said nut having oposed mating helical grooves, and anti-friction balls filling said grooves, whereby said one of said members may be displaced axially relative to the other in response to control of the gun by said power operated means.

4. In combination, a gun, power operated means for moving the gun in elevation, manually operable means for elevating and depressing the gun, comprising a screw shaft, a nut engaging said shaft, means for effecting relative rotation between said shaft and said nut for displacing one of these members axially, means responsive to axial displacement of said one of said members for moving the gun in elevation, means for operating the other of said members, a clutch between said means and the latter member, means effective on engagement of the clutch for rendering the power operated means ineffective, said shaft and said nut having opposed mating helical grooves, and anti-friction balls filling said grooves, whereby said one of said members may be displaced axially relative to the other in response to control of the gun by said power operated means.

5. In combination, a gun, power operated means for moving the gun in elevation, manually operable means for elevating and depressing the gun, comprising a screw shaft, a nut engaging said shaft, means for effecting relative rotation between said shaft and said nut for displacing one of these members axially, means responsive to axial displacement of said one of said members for moving the gun in elevation, means for operating the other of said members, a clutch between said means and the latter member, means for holding said clutch disengaged while the gun is being controlled by the power operated means, said shaft and said nut having opposed mating helical grooves, and anti-friction balls filling said grooves, whereby said one of said members may be displaced axially relative to the other in response to control of the gun by said power operated means.

6. In combination, a gun, power operated means for moving the gun in elevation, manually operable means for elevating and depressing the gun, comprising a screw shaft, a nut engaging said shaft, means for effecting relative rotation between said shaft and said nut for displacing one of these members axially, means responsive to axial displacement of said one of said members for moving the gun in elevation, means for operating the other of said members, a clutch between said means and the latter member, a switch for controlling the operation of the stabilizer, means tending to actuate said switch to render said power operated means ineffective, means effective while said clutch is engaged for rendering said switch actuating means ineffective, said shaft and said nut having opposed mating helical grooves, and anti-friction balls filling said grooves, whereby said one of said members may be displaced axially relative to the other in response to control of the gun by said power operated means.

7. In combination, a gun, power operated means for moving the gun in elevation, manually operable means for elevating and depressing the gun, comprising a screw shaft, a nut engaging said shaft, means for effecting relative rotation between said shaft and said nut for displacing one of these members axially, means responsive to axial displacement of said one of said members for moving the gun in elevation, a housing for supporting said members, gearing within the housing and carried thereby for operating the other of said members, juxtaposed clutch elements carried by the latter member and the gearing respectively, means operable externally of the housing for locking and releasing said clutch elements relative to each other, said shaft and said nut having opposed mating helical grooves, and anti-friction balls filling said grooves, whereby said one of said members may be displaced axially relative to the other in response to control of the gun by said power operated means.

8. In combination, a gun, power operated means for moving the gun in elevation, manually operable means for elevating and depressing the gun, comprising a screw shaft, a nut engaging said shaft, means for effecting relative rotation between said shaft and said nut for displacing one of these members axially, means responsive to axial displacement of said one of said members for moving the gun in elevation, a housing for supporting said members, gearing within the housing and carried thereby for operating the other of said members, a clutch between said gearing and the latter member, means disposed externally of the housing for operating the clutch, journalled trunnions on the housing for supporting it for rotary motion about an axis disposed transversely of said shaft, said shaft and said nut having opposed mating helical grooves, and anti-friction balls filling said grooves, whereby said one of said members may be displaced axially relative to the other in response to control of the gun by said power operated means.

9. In combination, a gun, power operated means and manually operable means for moving the gun in elevation, selectively operable means for alternately rendering one of said means effective and the other ineffective, said manually operable means comprising a screw shaft displaceable axially for elevating and depressing the gun, a nut engaging said screw shaft for effecting axial displacements thereof, means for operating said nut, said shaft and said nut having opposed mating helical grooves, and anti-friction balls filling said grooves, whereby said shaft may be displaced axially through said nut in response to control of the gun by said power operated means.

References Cited in the file of this patent

UNITED STATES PATENTS

| Number | Name | Date |
|---|---|---|
| 851,485 | Benet et al. | Apr. 23, 1907 |
| 1,296,303 | Manly | Mar. 4, 1919 |
| 1,559,566 | Farrell et al. | Nov. 3, 1925 |
| 1,819,697 | Boudette | Aug. 18, 1931 |
| 1,835,341 | Scharpenberg et al. | Dec. 8, 1931 |
| 2,159,225 | Phelps | May 23, 1939 |

FOREIGN PATENTS

| Number | Country | Date |
|---|---|---|
| 129,671 | Great Britain | July 24, 1919 |
| 541,767 | Great Britain | Dec. 10, 1941 |